United States Patent
Xu (10) Patent No.: US 11,842,446 B2
(45) Date of Patent: Dec. 12, 2023

(54) VR SCENE AND INTERACTION METHOD THEREOF, AND TERMINAL DEVICE

(71) Applicant: SHENZHEN INSTITUTE OF INFORMATION TECHNOLOGY, Guangdong (CN)

(72) Inventor: Shouxiang Xu, Guangdong (CN)

(73) Assignee: SHENZHEN INSTITUTE OF INFORMATION TECHNOLOGY, Guangdong (CN)

(*) Notice: Subject to any disclaimer, the term of this patent is extended or adjusted under 35 U.S.C. 154(b) by 0 days.

(21) Appl. No.: 17/311,602

(22) PCT Filed: Nov. 25, 2019

(86) PCT No.: PCT/CN2019/120515
§ 371 (c)(1),
(2) Date: Jun. 7, 2021

(87) PCT Pub. No.: WO2021/102615
PCT Pub. Date: Jun. 3, 2021

(65) Prior Publication Data
US 2022/0277523 A1    Sep. 1, 2022

(51) Int. Cl.
G06T 19/00      (2011.01)
G06F 3/04815    (2022.01)
G06F 3/01       (2006.01)

(52) U.S. Cl.
CPC ............ G06T 19/003 (2013.01); G06F 3/011 (2013.01); G06F 3/04815 (2013.01)

(58) Field of Classification Search
CPC .... G06T 19/003; G06F 3/011; G06F 3/04815; G06F 2203/012
See application file for complete search history.

(56) References Cited

U.S. PATENT DOCUMENTS 7,664,313 B1 * 2/2010 Sproat ................. G06F 18/00
704/9
10,406,437 B1 * 9/2019 Scheurwater ......... A63F 13/825
(Continued)

FOREIGN PATENT DOCUMENTS

CN      106940594 A    7/2017
CN      107103644 A    8/2017
(Continued)

OTHER PUBLICATIONS

Liu Xian-mei et al., Research on semantic environment model for virtual human, Computer Engineering and Design, vol. 32, No. I 1, 2011.
(Continued)

*Primary Examiner* — Jitesh Patel
(74) *Attorney, Agent, or Firm* — BROOKS KUSHMAN PC; John E. Nemazi (57) ABSTRACT

The present application discloses a VR scene and an interaction method thereof, and a computer-readable storage medium. The method includes: constructing a semantics path, here the semantics path is a trajectory drawn on geometry of the virtual environment agent and composed of nodes and directed connections among the nodes, and information of the nodes includes at least node position information, node behavior semantics information and node environment semantics information; the semantics path, moving the virtual character agent according to its own task and the semantics path, and executing a target action; acquiring action result information according to information of a target action of the virtual character agent at the node of the semantics path, and instructing the semantics path processing unit to update the node environment semantics information of the node of the semantics path. Embodiments (Continued)

of the present application can effectively realize interaction in the VR scene.

19 Claims, 4 Drawing Sheets

(56) References Cited

U.S. PATENT DOCUMENTS

| | | | |
|---|---|---|---|
| 2011/0173565 A1 | 7/2011 | Ofek et al. | |
| 2013/0229434 A1 | 9/2013 | Ofek et al. | |
| 2015/0310447 A1* | 10/2015 | Shaw ................ | G06Q 30/0201 |
| | | | 705/304 |

FOREIGN PATENT DOCUMENTS

| | | |
|---|---|---|
| CN | 109582140 A | 4/2019 |
| CN | 109806584 A | 5/2019 |
| CN | 109960545 A | 7/2019 |

OTHER PUBLICATIONS

Xu Shouxiang et al., Journal of Shenzhfen Institute of Information Technology, vol. 16 No. 2, Jun. 2018.
International Search Report for PCT/CN2019/120515, prepared by the CN Patent Office, dated Aug. 26, 2020, 5 pages.

* cited by examiner

VR SCENE AND INTERACTION METHOD THEREOF, AND TERMINAL DEVICE

CROSS REFERENCE TO RELATED APPLICATIONS

The present application is a National Stage of PCT Application No. PCT/CN2019/120515 filed on Nov. 25, 2019, the content of which is incorporated herein in its entity.

TECHNICAL FIELD

The present application involves in the technical field of VR (Virtual Reality) technologies, and particularly to a VR scene, a VR scene interaction method, and a terminal device.

BACKGROUND

Existing VR scenes usually consist of virtual characters and virtual environments. The virtual character refers to a three-dimensional model generated through VR technologies and provided with a human appearance, an animal appearance, or a phantom appearance (such as a flying dragon) designed by humans, and it is capable of simulating the perception and behavior of humans or animals. Exactly as humans and animals need their own living environment in real life, the virtual character also need its living environment, and the virtual environment is the living environment of the virtual character. Through co-presentation of the virtual character and the virtual environment, the VR scene provided with senses of reality and immersion is constituted thereby together.

TECHNICAL PROBLEM

Given this, embodiments of the present application provide a VR scene, an interaction method thereof, and a terminal device, so as to solve the problem in the art how to conveniently and effectively realize the interaction between the virtual characters and the virtual environments in the VR scenes.

SUMMARY

A first aspect of the present application provides a VR scene, which includes a virtual environment agent, a virtual character agent, and a semantics path processing unit;
the semantics path processing unit is configured to construct a semantics path, the semantics path is a trajectory drawn on geometry of the virtual environment agent and composed of nodes and directed connections among the nodes, and information of the nodes includes at least node position information, node behavior semantics information and node environment semantics information;
the virtual character agent is configured to acquire the semantics path, move according to its own task and the semantics path, and execute a target action according to the node behavior semantics information and the node environment semantics information of the node when position information of the virtual character agent is consistent with the node position information of the node of the semantics path;
the virtual environment agent is configured to acquire information of the target action of the virtual character agent at the node of the semantics path, acquire action result information according to the information of the target action and the node environment semantics information of the node, and instruct the semantics path processing unit to update the node environment semantics information of the node of the semantics path according to the action result information.

A second aspect of the present application provides a VR scene interaction method, which is applied to a semantics path processing unit and includes steps of:
receiving a user instruction and constructing a semantics path, here the semantics path is a trajectory drawn on geometry of a virtual environment agent and composed of nodes and directed connections among the nodes, and information of the nodes includes at least node position information, node behavior semantics information and node environment semantics information;
acquiring action result information of the virtual environment agent, and updating the node environment semantics information of the node of the semantics path according to the action result information.

A third aspect of the present application provides a VR scene interaction method, which is applied to a virtual character agent and includes steps of:
acquiring a semantics path, here the semantics path is a trajectory drawn on geometry of a virtual environment agent and composed of nodes and directed connections among the nodes, and information of the nodes includes at least node position information, node behavior semantics information and node environment semantics information;
moving according to its own task and the semantics path;
executing a target action according to the node behavior semantics information and the node environment semantics information of the node when position information of the virtual character agent is consistent with the node position information of the node of the semantics path.

A fourth aspect of the present application provides a VR scene interaction method, which is applied to a virtual environment agent and includes steps of:
acquiring information of a target action of the virtual character agent at a node of a semantics path, here the semantics path is a trajectory drawn on geometry of a virtual environment agent and composed of the nodes and directed connections among the nodes, and information of the nodes includes at least node position information, node behavior semantics information and node environment semantics information;
acquiring action result information according to the information of the target action and the node environment semantics information of the node;
instructing a semantics path processing unit to update the node environment semantics information of the node of the semantics path according to the action result information.

A fifth aspect of the present application provides a semantics path processing unit, which includes:
an instruction receiving module configured to receive a user instruction and construct a semantics path, here the semantics path is a trajectory drawn on geometry of a virtual environment agent and composed of nodes and directed connections among the nodes, and information of the nodes includes at least node position information, node behavior semantics information and node environment semantics information;
a node environment semantics information update module configured to acquire action result information of the virtual environment agent and update the node environment semantics information of the node of the semantics path according to the action result information.

A sixth aspect of the present application provides a virtual character agent, which includes: a semantics path acquisition module configured to acquire a semantics path, here the semantics path is a trajectory drawn on geometry of a virtual environment agent and composed of nodes and directed connections among the nodes, and information of the nodes includes at least node position information, node behavior semantics information and node environment semantics information;
- a movement module configured to move according to its own task and the semantics path;
- a target action execution module configured to execute a target action according to the node behavior semantics information and the node environment semantics information of the node when position information of the virtual character agent is consistent with the node position information of the node of the semantics path.

A seventh aspect of the present application provides a virtual environment agent, which includes:
- a target action information acquisition module configured to acquire information of a target action of a virtual character agent at a node of a semantics path, here the semantics path is a trajectory drawn on geometry of the virtual environment agent and composed of the nodes and directed connections among the nodes, and information of the nodes includes at least node position information, node behavior semantics information and node environment semantics information;
- an action result information acquisition module configured to acquire action result information according to the information of the target action and the node environment semantics information of the node;
- an instruction update module configured to instruct a semantics path processing unit to update the node environment semantics information of the node of the semantics path according to the action result information.

An eighth aspect of the present application provides a terminal device, which includes a memory, a processor, and a computer program stored in the memory and executable on the processor, and the processor, when executing the computer program, implements any VR scene interaction method in the above aspects from the second to the fourth.

A ninth aspect of the present application provides a computer-readable storage medium, with a computer program stored thereon, and the computer program, when executed by a processor, implements any VR scene interaction method in the above aspects from the second to the fourth.

A tenth aspect of the present application provides a computer program product, and the computer program product, when executed on a terminal device, causes the terminal device to execute any VR scene interaction method in the above aspects from the second to the fourth.

BENEFICIAL EFFECTS

In the embodiments of the present application, the VR scene includes the virtual environment agent, the virtual character agent, and the semantics path processing unit, and the semantics path drawn on the geometry of the virtual environment agent and composed of the nodes and the directed connections is constructed, and the nodes of the semantics path include the node position information, the node behavior semantics information, and the node environment semantics information. Since the semantics path can not only instruct the movement of the virtual character agent, but also send the node behavior semantics information and the node environment semantics information to the virtual character agent so as to instruct the virtual character agent to execute the target action, and at the same time, it can acquire the action result information generated under the action of the target action on the virtual environment agent in time, and update the environment semantics information of the semantics node, so that the virtual character agent can make the execution decision of the next target action. That is, the semantics path constructed by the semantics path processing unit can be used as the medium between the virtual character agent and the virtual environment agent, which can not only instruct the behavior decision of the virtual character agent but also record the changes of the virtual environment agent. Therefore, through this semantics path, the interaction between the virtual character and the virtual environment in the VR scene can be conveniently and effectively realized.

DESCRIPTION OF THE DRAWINGS

In order to more clearly describe the technical solutions in the embodiments of the present application or in the art, the drawings needed to be used in the description for the embodiments or the prior art will be briefly introduced below. Obviously, the drawings in the following description are only some embodiments of the present application, and other drawings may be obtained based on these drawings for those of ordinary skill in the art without paying any creative effort.

IMPLEMENTATIONS OF THIS APPLICATION

In the following description, for the purpose of illustration rather than limitation, specific details such as a specific system structure and technology are proposed for a thorough understanding of the embodiments of the present application. However, it should be understood by those skilled in the art that the present application can also be implemented in other embodiments without these specific details. In other cases, detailed descriptions for well-known systems, devices, circuits, and methods are omitted to avoid unnecessary details from obstructing the description for the present application.

In order to illustrate the technical solutions of the present application, specific embodiments are used for illustration below.

It should be understood that, when used in this specification and appended claims, the term "comprising" indicates existence of a described feature, whole, step, operation, element and/or component, but does not exclude existence or addition of one or more other features, wholes, steps, operations, elements, components and/or collections thereof.

It should also be understood that the terms used in the specification of the present application are only for the purpose of describing specific embodiments and are not intended to limit the present application. As used in the specification and the appended claims of the present application, the singular forms "a", "an" and "the" are intended to include plural forms, unless other cases are clearly indicated otherwise.

It should be further understood that the term "and/or" used in the specification and appended claims of the present application refers to any combination and all possible combinations of one or more of items listed in association, and includes these combinations.

As used in the specification and the appended claims, the term "if" may be interpreted as "when" or "once" or "in response to determination of . . . " or "in response to detection of . . . " depending on the context. Similarly, the phrase "if . . . is determined" or "if [a described condition or event] is detected" may be interpreted as meaning "once . . . is determined" or "in response to determination of . . . " or "once [a described condition or event] is detected" or "in response to detection of [a condition or event described]" depending on the context.

In addition, in the description of the present application, the terms "first", "second", etc. are only used to distinguish the description, and cannot be understood as indication or implication of relative importance.

Figure 1:
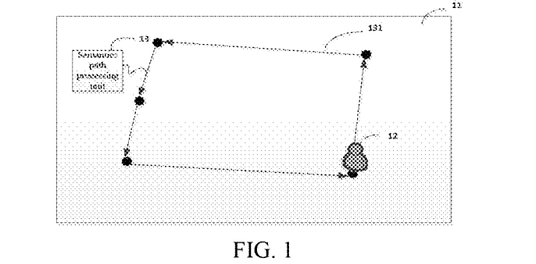
FIG. 1 is a schematic structural diagram of a VR scene provided by the present application.

FIG. 1 is a schematic structural diagram of a VR scene provided by an embodiment of the present application, in which the VR scene includes a virtual environment agent 11, a virtual character agent 12, and a semantics path processing unit 13. The semantics path processing unit 13 is configured to construct a semantics path 131, the semantics path 131 is a trajectory drawn on geometry of the virtual environment agent and composed of nodes and directed connections among the nodes, and information of the nodes includes at least node position information, node behavior semantics information and node environment semantics information.

In the previous VR scenes, the virtual character and the virtual environment are two separate and independent units. Although the virtual character and the virtual environment can be seen graphically appeared in the same scene frame, the behavior of the virtual character does not actually interact with the virtual environment where the virtual character is located, and a coordination function seemed to be provided with interaction can only be realized when it is required to perform a complicated program construction and combination on the two units respectively. That is, in the existing VR scenes, it is difficult for the virtual character and the virtual environment to interact conveniently and effectively, and it is difficult for the virtual character to make a behavior decision based on specific status information of the virtual environment. In the embodiment of the present application, both the virtual character and the virtual environment are agents that have three-dimensional geometric appearances and are capable of recognizing and transforming semantics information, which are called the virtual character agent and the virtual environment agent. Through the node position information, the node behavior semantics information and the node environment semantics information of the semantics path that is drawn on the geometry of the virtual environment agent, the virtual character agent is instructed to walk and execute a target action on the virtual environment agent, and the influence of the virtual character agent's action on the virtual the environment agent is recorded. That is, using the semantics path as a medium of the virtual character agent and the virtual environment agent, the interaction between the virtual character and the virtual environment can be realized conveniently and effectively.

Specifically, the semantics path in the embodiment of the present application is provided with the following three functions: the first is the function of the path itself, which solves the problem of routing planning of the virtual character agent; the second is the function of serializing the behavior of the virtual character agent, so as to solve the problem of behavior planning of the virtual character to perform a certain task; the third is the function of environment semantics, which solves the problem of the virtual character agent's perception on the virtual environment agent through providing status and change information of related entities near the various location nodes by the path nodes.

Specifically, the semantics path processing unit is configured to construct the semantics path, and the semantics path is the trajectory drawn on the geometry of the virtual environment agent and composed of the nodes and the directed connections among the nodes, and information of the nodes includes at least the node position information, the node behavior semantics information and the node environment semantics information.

Figure 2:
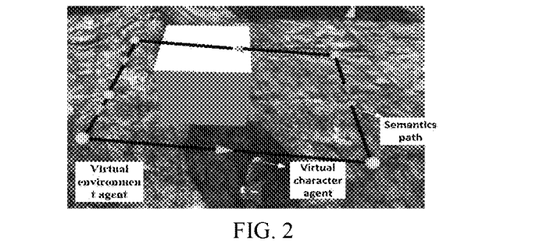
FIG. 2 is a schematic diagram of a frame of the VR scene provided by the present application.

FIG. 2 shows a schematic diagram of a frame of the VR scene. The frame of the VR scene includes the virtual environment agent, the virtual character agent acting on the virtual environment agent, and the semantics path drawn on the geometry of the virtual environment agent. The semantics path is constructed by the semantics path processing unit. Specifically, the semantics path is composed of the nodes and the directed connections among the nodes, and the information of the nodes includes at least the node position information, the node behavior semantics information and the node environment semantics information of the nodes, and the directed connections constitute information about a direction and a distance for each of the nodes to be able to set out and be entered into. Specifically, the position information of the nodes records coordinate information of the nodes on the virtual environment agent; the node behavior semantics information records a behavior that the virtual character agent needs to complete when the virtual character agent walks to the node, which may be represented by a corresponding behavior identification number, for example, using behaviorState=28 to indicate that the behavior of opening or closing a door is required here; the node environment semantics information records state information of the virtual environment agent where the node is located in real time, which may be represented by a corresponding state identification number, for example, using environmentState=29 to indicates that a door near the node is at a closed state.

Specifically, the virtual character agent is configured to acquire the semantics path, move according to its own task and the semantics path, and execute a target action according to the node behavior semantics information and the node environment semantics information of the nodes when position information of the virtual character agent is consistent with the node position information of the nodes of the semantics path.

The virtual character agent is an agent that is provided with geometry information about a character appearance (such as a simulated human figure, animal figure, etc.) and is capable of autonomously performing path planning and a behavior decision based on the information of the semantics path and its own task. The virtual character agent acquires the semantics path drawn on the virtual environment agent, determines a target position to be reached according to its own task, performs the path planning according to the semantics path, and determines a target trajectory of the semantics path that needs to be traveled for reaching the target position. The target trajectory may be a complete trajectory of the semantics path, or a part trajectory in the semantics path. The virtual character moves on the semantics path according to the planned target trajectory, and acquires the node behavior semantics information and the node environment semantics information of this node when the virtual character agent detects that its own position information is consistent with the node position information of one node of the semantics path, and executes the target action according to the node behavior semantics information and the node environment semantics information. For example, when the virtual character agent detects that its own position information is consistent with the node position information of the node A of the semantics path, it acquires the node behavior semantics information "behaviorState=28" (indicating that a behavior of opening or closing the door is required here) and the node environment semantics information "environmentState=29" (indicating that a door near this node is at a closed state) of the node A, and determines that the target action to be executed at the node A is an action of opening the door according to the node behavior semantics information and the node environment semantics information. Specifically, after the virtual character agent executes the target action, it sends information identifying the target action to the virtual environment agent, and the target action information may be an identification number that identifies the target action.

Specifically, the virtual environment agent is configured to acquire the information on the target action of the virtual character agent at the node of the semantics path, and acquire action result information according to the target action information and the node environment semantics information of the node, and instruct the semantics path processing unit to update the node environment semantics information of the nodes of the semantics path according to the action result information.

The virtual environment agent is an agent that is provided with three-dimensional simulated environment geometry information, is capable of perceiving surrounding things and acting on the surrounding things through an executor. The virtual environment agent acquires the target action information transmitted by the virtual character agent and the node environment semantics information of the node where the virtual character agent is currently located, and acquires environment state change information of a position in the virtual environment agent corresponding to this node through a state conversion axiom (i.e., a preset state conversion mapping relationship, which may be a state conversion mapping table) of the virtual environment agent itself after the target action acts on the virtual environment agent, and this environment state change information is called the action result information. For example, the virtual character agent executes the action of opening the door (the action identification number may be Action_OpenDoor) at the node A where the node behavioral semantics information is "behaviorState=28" (indicating that the behavior of opening or closing the door is required here) and the node environment semantics information is "environmentState=29" (indicating that the door near this node is at the closed state). The virtual environment agent acquires the node environment semantics information "environmentState=29" and the action identification number "Action_OpenDoor" of this node, and acquires that the corresponding action result information after the door opening action is executed is that the door has been opened through querying the preset state conversion mapping relationship, and updates the environmental semantics information of this node on the semantics path according to the action result information, that is, the original "environmentState=29" is changed to be "environmentState=30" (indicating that one door near this node is at an open state).

For ease of understanding, as an example and not a limitation, an application example in which the VR scene is specifically a guard patrol scene is provided below.

The virtual environment agent of the guard patrol scene is specifically a designated patrol area environment, the virtual character agent is specifically a guard character, and the semantics path constructed by the semantics path processing unit is specifically a patrol semantics path. The patrol semantics path is drawn in advance on the designated patrol area environment and includes patrol nodes and the directed connection between the patrol nodes, and the patrol nodes set the node position information, the node behavior semantics information and the node environment semantics information in advance according to their specific positions in the designated patrol area environment.

Among them, the node behavior semantics information may be stored by using a variable behaviorState, the behaviorState=28 indicates that a behavior of opening or closing a door is required here; the behaviorState=29 indicates that a behavior of checking a window is required here; and the behaviorState=30 indicates that a behavior of executing an emergency handling of a fire according to a fire situation at the scene is required here, and the like.

The node environment semantics information may be stored by using a variable environmentState, the environmentState=29 indicates that a door near this node is at a closed state, the environmentState=30 indicates that a door near this node is at an open state; the environmentState=31 indicates that a window near this node is already in a damaged state, the environmentState=32 indicates that a damaged window near this node has been repaired; the environmentState=33 indicates that a vicinity of this node is already in a fire state, and the environmentState=34 indicates that a fire situation near this node has been disposed of, and the like.

The guard character performs path planning according to the semantics path and moves on the semantics path. When the guard character arrives at the node A where the node behavior semantics information is "behaviorState=28" and the node environment semantics information is "environmentState=29", the guard character performs the action of opening the door, and the designated patrol area environment receives information on this action and acquires the action result information that the door has been opened, and instructs the patrol semantics path to correspondingly change the node environment semantics information of the node A from "environmentState=29" to "environment- State=30". When the guard character arrives at the node B where the node behavior semantics information is "behaviorState=29" and the node environment semantics information is "environmentState=31", the guard character performs the action of repairing the window, and the designated patrol area environment receives the information on this action and acquires the action result information that the window has been repaired, and instructs the patrol semantics path to correspondingly change the node environment semantics information of the node B from "environmentState=31" to "environmentState=32". When the guard character arrives at the node C where the node behavior semantics information is "behaviorState=30" and the node environment semantics information is "environmentState=33", the guard character performs the action of the fire disposal, and the designated patrol area environment receives the information on this action and acquires the action result information that the fire has been disposed, and instructs the patrol semantics path to correspondingly change the node environment semantics information of the node C from "environmentState=33" to "environmentState=34".

Understandably, the semantics path in the embodiments of the present application is not limited to the path drawn on land graphics of the virtual environment agent. When the virtual environment agent includes water graphics or sky graphics, the semantics path may also be a trajectory drawn on the water graphics or a trajectory drawn on the sky graphics. For example, as an example, the VR scene of an embodiment of the present application may be a surreal scene of flying dragon activities, and the virtual character agent of this scene is an unreal image—a flying dragon; the geometry of the virtual environment agent of this scene specifically includes water graphics such as a river, sea etc. and sky graphics; the semantics path processing unit draws a trajectory composed of nodes and directed connections among the nodes on the water graphics such as the river, sea etc. and the sky graphics as the semantics path, and sets on each of the nodes the corresponding node behavior semantics information of the behavior that the flying dragon needs to execute, and the node environment semantics information corresponding to each of the nodes; and the flying dragon can make a behavior decision according to the semantics path drawn on the waters graphics of the virtual environment agent, such as the river, sea etc. or drawn on the sky graphics of the virtual environment agent, thereby realizing the surreal scenes that the flying dragon overturns the river and sea or flying through the air.

In the embodiments of the present application, the VR scene includes the virtual environment agent, the virtual character agent, and the semantics path processing unit which constructs the semantics path drawn on the virtual environment agent and composed of the nodes and the directed connections among the nodes, and the nodes of the semantics path include the node position information, the node behavior semantics information, and the node environment semantics information. Because the semantics path can not only instruct the movement of the virtual character agent, but also send the node behavior semantics information and the node environment semantics information to the virtual character agent so as to instruct the virtual character agent to execute the target action, and at the same time, it can acquire the action result information of the target action acting on the virtual environmental agent in time and updates the environment semantics information of the semantics nodes so that the virtual character agent can make an execution decision of the next target action. That is, the semantics path constructed by the semantics path processing unit can be used as the medium of the virtual character agent and the virtual environment agent, which can not only instruct the behavioral decision of the virtual character agent but also record the changes of the virtual environment agent. Therefore, through this semantics path, the interaction between the virtual character and the virtual environment in the VR scene can be conveniently and effectively realized.

Figure 3:
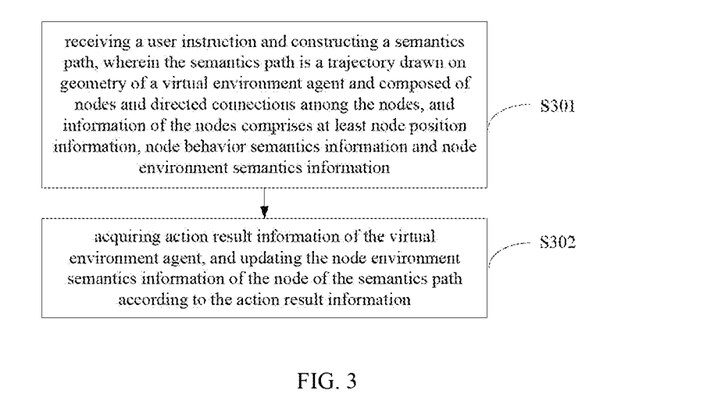
FIG. 3 is a flow diagram of a first method for implementing a VR scene provided by the present application.

FIG. 3 shows a flow diagram of a first VR scene interaction method provided by an embodiment of the present application. An execution subject of this embodiment of the present application is a semantics path processing unit, which is described in detail below.

In a step S301, receive a user instruction, and construct a semantics path. The semantics path is a trajectory drawn on geometry of a virtual environment agent and composed of nodes and directed connections among the nodes, and information of the nodes includes at least node position information, node behavior semantics information and node environment semantics information.

A user's click instruction or touch instruction on a frame of the VR scene is received and the semantics path is constructed. The semantics path is composed of the nodes and the directed connections among the nodes, and the information of the nodes includes at least the node position information, the node behavior semantics information and the node environment semantics information of the nodes, and the directed connections constitute information about a direction and a distance for each of the nodes to be able to set out and be entered into. Specifically, the position information of the node records coordinate information of this node on the virtual environment agent; the node behavior semantics information records a behavior that a virtual character agent needs to complete accordingly when traveling to this node, which may be represented by a corresponding behavior identification number; the node environment semantics information records state information of the virtual environment agent at a position where this node is located in real time, which may be represented by a corresponding state identification number.

Optionally, the step S301 includes:

S30101, receiving a drawing instruction, and drawing the nodes of the semantics path and the directed connections among the nodes on the geometry of the virtual environment agent;

S30102, receiving a behavior semantics information selection instruction, and adding the node behavior semantics information for the nodes of the semantics path; and S30103, receiving an environment semantics selection instruction, and adding initial node environment semantics information for the nodes of the semantics path.

Figure 4:
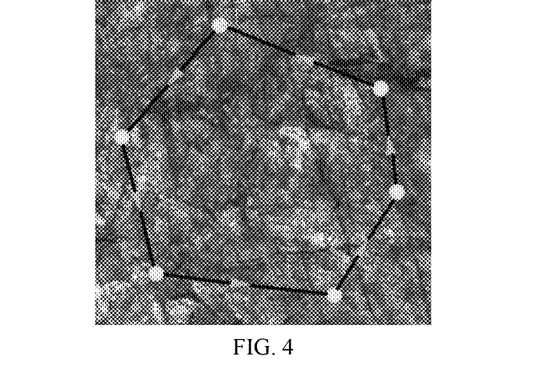
FIGS. 4-6 are schematic diagrams of three semantics paths provided by the present application.
Figure 5:
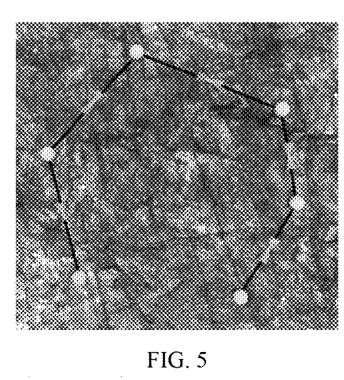

In the step S30101, the drawing instruction is received, specifically, the user's node selection instruction on the geometry figure of the virtual environment agent (that is, clicking on the virtual environment agent to select several designated positions as the nodes of the semantics path) is received and the user' sliding instruction for connecting the selected nodes is received, thereby completing the drawing of the nodes and the directed connections among the nodes on the geometry figure of the virtual environment agent, that is, completing the trajectory drawing of the semantics path. Specifically, the directed connections may be bi-directed connections, for example, the directed connection between the node A and the node B of the semantics path may have both directions A→B and B→A for the virtual character agent to make a movement decision. Optionally, the semantics path may be a circular semantics path as shown in FIG. 4, or a non-circular semantics path as shown in FIG. 5.

Figure 6:
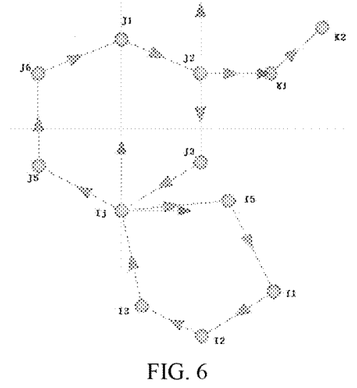

Optionally, the semantics path may also be a compound path composed of a plurality of circular semantics sub-paths and/or non-circular semantics sub-paths, as shown in FIG. 6.

In the step S30102, the user's behavior semantics information selection instruction on the nodes of the drawn semantics path is received, and the node behavior semantics information is added to each of the nodes of the semantics path.

In the step S30103, the user's environment semantics information selection instruction on the nodes of the drawn semantics path is received, and initial node environment semantics information is added to each of the nodes of the semantics path.

In an embodiment of the present application, since the semantics path processing unit can complete the construction of the semantics path on the virtual environment agent by simply receiving the user's instruction without complicated programming, so the construction of the semantics path can be more convenient and flexible, thereby reducing the difficulty for developing the construction of the VR scene.

Optionally, the information of the nodes further includes node traffic status information. Correspondingly, the step S301 further includes:

S30104, receiving a node passage state information selection instruction, and adding node passage state information to each of the nodes of the semantics path, where the node passage state information includes first identification information used to identify the node as a path conversion node, and second identification information used to identify the node as a temporarily closed node.

In the embodiment of the present application, the information of each of the nodes on the semantics path further includes the node traffic status information, which is used to identify whether the node can be passed through and whether the node is a conversion node that conforms to the path. Specifically, the node passage state information includes the first identification information used to identify the node as the path conversion node, and the second identification information used to identify the node as the temporarily closed node. The node passage state information may be stored by using a variable "nodeState", for example, as shown in FIG. 6, the node Ij is the path conversion node, the first identification information is added to the node Ij to identify this node as the path conversion node, and the first identification information may be "nodeState=3", and the information of the node Ij further includes position information of all next nodes that are available for selection (for example, the position information of I5 and J5). Assuming that K1 in the FIG. 6 is the temporarily closed node that the virtual character agent is not allowed to pass through, then the second identification information is added to the node K1, for example, let "nodeState=4" which indicates that this node is one temporarily closed node and indicates that this node cannot be used as a passage point. If the node is neither the path conversion node nor the temporarily closed node, then this node's passage state information may be directly set as "nodeState=0" by default. In the embodiment of the present application, since the information of the nodes further includes the node passage state information, the virtual character agent can be instructed to perform the path planning more accurately.

In a step S302, acquire action result information of the virtual environment agent, and update the node environment semantics information of the nodes of the semantics path according to the action result information.

When the virtual character agent executes the target action on the target node such that the state of the virtual environment agent changes, that is, when the virtual environment agent generates the action result information, the semantics path processing unit acquires the action result information in time and updates the node environment semantics information of the target node based on the action result information. For example, the original node environment semantics information of the node A is "environmentState=29" (indicating that a door near the node A is at a closed state), when the virtual character agent performs an action of opening the door on the target node, the action result information is that the door has been opened, and the environmental semantics information of this node on the semantics path is updated according to this action result information, that is, the original "environmentState=29" is changed to be "environmentState=30" (indicating that the door near this node is at an open state).

In the embodiments of the present application, the semantics path processing unit constructs the semantics path by receiving the instruction from the user. The semantics path is composed of the nodes and the directed connections among the nodes, each of the nodes is carried with the information such as the node position information, the node behavior semantics information and the node environment semantics information etc., and the node environment semantics information of the nodes can be updated in time according to the action result information generated by the virtual environment agent. Since the semantics path includes the node position information and the directed connections, the virtual character agent can be instructed to perform the path planning and move; since the semantics path includes the node behavior semantics information and the node environment semantics information, the virtual character agent can be instructed to perform the target action on the nodes; since the node environment semantics information of the semantics path can further be updated in time based on the action result information generated by the virtual environment agent, the environment semantics information of the semantics nodes can be recorded and updated in time so that the virtual character agent can perform the execution decision of the next target action; In view of the above, the semantics path can effectively instruct the behaviors of the virtual character agent on the virtual environment agent, and conveniently and effectively realize the interaction between the virtual character and the virtual environment in the VR scene.

Figure 7:
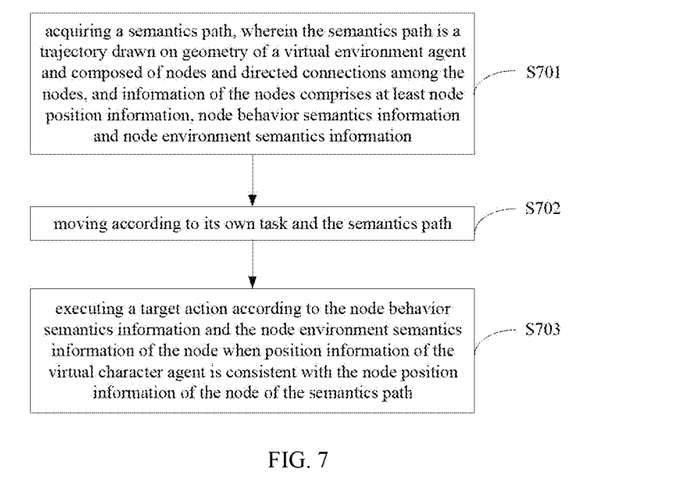
FIG. 7 is a flow diagram of a second method for implementing a VR scene provided by the present application.

FIG. 7 shows a flowchart diagram of a second VR scene interaction method provided by an embodiment of the present application. An execution subject of this embodiment of the present application is a virtual character agent, and the virtual character agent is an agent that is provided with geometry information about a character appearance (such as a simulated human figure, animal figure, etc.) and is capable of autonomously performing path planning and a behavior decision based on information of the semantics path and its own task. The details are described as follows:

In a step S701, acquire a semantics path. Here the semantics path is a trajectory drawn on geometry of a virtual environment agent and composed of nodes and directed connections among the nodes, and information of the nodes includes at least node position information, node behavior semantics information and node environment semantics information.

The virtual character agent acquires the semantics path, the semantics path is the trajectory drawn on the geometry figure of the virtual environment agent in advance and composed of the nodes and the directed connections among the nodes, and the information of the nodes includes at least the node position information, the node behavior semantics information and the node environment semantics information. Among them, the node position information records coordinate information of the nodes on the virtual environment agent; the node behavior semantics information records a behavior that the virtual character agent needs to complete accordingly when travelling to each of the nodes, which may be represented by a corresponding behavior identification number; the node environment semantics information records state information of the virtual environment agent where each of the nodes is located in real time, which may be represented by a corresponding state identification number.

Optionally, the virtual character agent acquires an ordered node sequence group of the semantics path from a semantics path processing unit, and each element in the node sequence group includes sequence numbers of the nodes, the node position information, the node behavior semantics information and the node environmental semantics information of the nodes, etc. Optionally, the virtual character agent is provided with a visual recognition function, and recognizes and acquires the trajectory of the drawn semantics path from the VR scene through vision.

In a step S702, move according to its own task and the semantics path.

The virtual character agent performs path planning and movement according to its own tasks and the acquired semantics path. For example, suppose that the task of the virtual character agent is to patrol on a designated area, then the virtual character moves according to the trajectory of the semantics path contained in the designated area.

Optionally, the step S702 specifically includes:

moving according to its own task, the node location information and node passage status information of the semantics path.

Optionally, the nodes of the semantics path further include the node passage status information. When the virtual character agent is performing the path planning, in addition to combining its own task and the node position information of the semantics path, it also considers the node passage status information to plan the movement path. For example, if it is detected that the node passage state information of the node K1 in the semantics path is "nodeState=4", then it indicates that this node is a temporarily closed node, and the virtual character agent should avoid this node when performing the path planning. After that, the virtual character agent moves according to the planned path.

In a step S703, when position information of the virtual character agent is consistent with the node position information of one node of the semantics path, executing a target action according to the node behavior semantics information and the node environment semantics information of this node.

When the virtual character agent detects that its own position information is consistent with the node position information of one of the nodes in the semantics path, it indicates that the virtual character agent is currently moving to this node, and at this time executes the target action according to the node behavior semantics information and node environment semantics information of this node.

Specifically, the step S703 includes the following.

At a step S70301, determine a target behavior according to the node behavior semantics information, when the position information of the virtual character agent is consistent with the node position information of one node of the semantics path.

When the position information of the virtual character agent is consistent with the node position information of one node of the semantics path, the node behavior semantics information of this node is obtained, and the target behavior that the virtual character agent needs to complete on this node is determined. For example, when the position information of the virtual character agent is consistent with the node position information of the node A of the semantics path, the node behavior semantics information of the node A "behaviorState=28" (indicating that a behavior of opening or closing a door is required here) is acquired, and the target behavior that the virtual character agent needs to complete on this node is a behavior of operating the door.

At a step S70302, determine and execute a target action according to an execution base corresponding to the target behavior and the node environment semantics information, here the execution base is a two-tuple that stores the environment semantics information and the target action correspondingly.

The execution base of each behavior is pre-stored in the virtual character agent. The execution base is a two-tuple (b, z) that stores the environment semantics information and the target action correspondingly, which indicates that the target action b is executed when the environment semantics information is equivalent to z. A corresponding plurality of execution bases are required according to the target behavior, and the target action b corresponding to the current environment semantics information is looked up according to the node environment semantics information. For example, assuming that the target behavior is a behavior of operating the door, and two execution bases corresponding to the target behavior ((the action of opening the door, the door is at the closed state), (the action of closing the door, the door is at the open state)) are pre-stored in the virtual character agent; assuming that the current node environment semantics information is environmentState=29 (indicating that one door near the node at the closed state), then the virtual character agent queries the two execution bases of the operation behaviors on the door according to the node environment semantics information, and determines the current target action to be executed is the action of opening the door.

Specifically, the step of executing the target action includes:

executing target action frames and sending information on the target action to the virtual environment agent.

The virtual character agent executes the action of opening the door specifically through allowing itself to run the target action frames, that is, the virtual character agent is shown having performed the target action by allowing the geometry information of the virtual character agent to undergo a specified dynamic change. For example, if the target action is the action of opening the door, the target action frames stored corresponding to the action of opening the door are played, and the virtual character agent is shown having performed the action of opening the door on the frames of virtual scene through the action frames. At the same time with or after executing the target action frames, the virtual character agent sends the information on the target action to the virtual environment agent, and the virtual character agent may communicate that the virtual character has currently performed the target action to the virtual environment agent by sending a action identification number corresponding to the target action.

In the embodiments of the present application, the virtual character agent acquires the semantics path, moves according to the node position information of the semantics path, and executes the target action according to the node behavior semantics information and the node environment semantics information of this node on the semantics path when reaching each of the nodes. That is, the virtual character's behavior decision on the virtual environment agent is conveniently and effectively instructed through the semantics path, thereby effectively realizing the interaction between the virtual character and the virtual environment in the VR scene.

Figure 8:
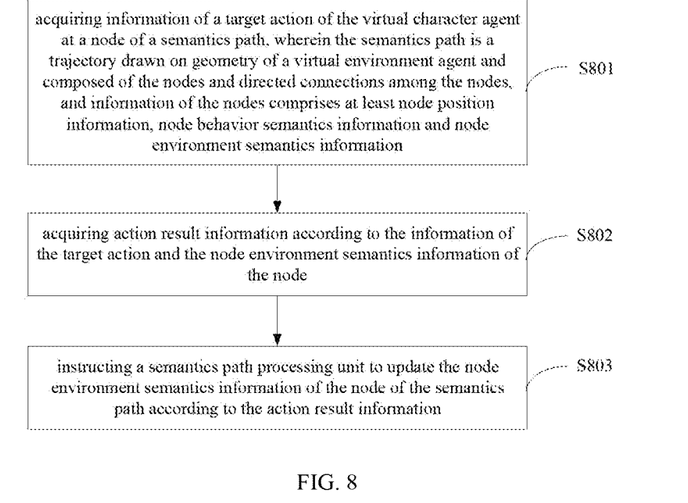
FIG. 8 is a flow diagram of a third method for implementing a VR scene provided by the present application.

FIG. 8 shows a flow diagram of a third VR scene interaction method provided by an embodiment of the present application. An execution subject of this embodiment of the present application is a virtual environment agent, and the virtual environment agent is an agent that is provided with three-dimensional simulated environment geometry information and is capable of perceiving surrounding things and acting on the surrounding things through an executor. The details are described as follows.

In a step S801, acquire information of a target action of a virtual character agent at a node of a semantics path. Here the semantics path is a trajectory drawn on geometry of the virtual environment agent and composed by the nodes and the directed connections among the nodes, and information of the nodes includes at least node position information, node behavior semantics information, and node environment semantics information.

The semantics path in this embodiment of the present application is a trajectory drawn in advance on the geometry of the virtual environment agent and composed of the nodes and the directed connections among the nodes. The information of the nodes includes at least the node position information, the node behavior semantics information, and the node environment semantics information. Among them, the node position information records coordinate information of the nodes on the virtual environment agent; the node behavior semantics information records a behavior that the virtual character agent needs to complete when travelling to the node, which may be represented by a corresponding behavior identification number; the node environment semantics information records state information of the virtual environment agent where the nodes are located in real time, which may be represented by a corresponding state identification number.

The virtual environment agent acquires the information of the target action performed by the virtual character agent on one node of the semantics path, and the information of the target action may be an action identification number corresponding to the target action. For example, the virtual environment agent acquires information about an action of opening a door performed by the virtual character agent on the node A, and the action identification number may be "Action_OpenDoor".

In a step S802, acquire action result information according to the information of the target action and the node environment semantics information of the node.

According to the information of the target action and the node environment semantics information of the node, environment state change information of a position in the virtual environment agent corresponding to the node is acquired after the target action has acted on the virtual environment agent, and this information is called the action result information.

Specifically, the step S802 includes:

querying environment state conversion mapping relationship of the virtual environment agent according to the information of the target action and the node environment semantics information of the node to acquire the action result information.

The virtual environment agent pre-stores the environment state conversion mapping relationship, which may also be called a state conversion axiom of the virtual environment agent. Optionally, the environment state transition mapping relationship may be realized through a state conversion mapping table, and each item of the state conversion mapping table stores the information of the target action, the node environment semantics information of the node before the action is executed, and the corresponding action result information after the target action is executed. According to the acquired information of the target action and the node environment semantics information of the current node, the state conversion mapping table is queried, and the corresponding action result information may be acquired after the target action is executed at the current node. For example, the stored information corresponding to one item in the state conversion mapping table pre-stored in the virtual environment agent is as follows:

| the information of the target action | the node environment semantics information of the node before the action is executed | the action result information |
| --- | --- | --- |
| Action_OpenDoor | environmentState=29 | environmentState=30 |

When the virtual environment agent acquires that the information of the target action of the virtual character on the node A is "Action_OpenDoor" (indicating an action of opening a door), and the node environment semantics information of the node before execution of the action is "environmentState=29" (indicating that a door near this node is at a closed state), then the corresponding action result information is acquired to be "environmentState=30" (indicating that the door at this node is changed to be at an open state).

In a step S803, instruct a semantics path processing unit to update the node environment semantics information of the node of the semantics path according to the action result information.

According to the action result information, the semantics path unit is instructed to update the node environment semantics information of the node. For example, after the action result information "environmentState=30" is acquired at the node A, the semantics path unit is instructed to change the node environment semantics information of the node A from the original "environmentState=29" (indicating that the door near this node is at the closed state) to "environmentState=30" (indicating that the door near this node is at the open state).

In the implementation of the present application, since the virtual environment agent can instruct the semantics path unit to promptly update the node environment semantics information of this node of the semantics path according to the action result information after acquiring the information of the target action on one node and acquiring the corresponding action result information, so that the virtual character agent makes a decision for the next target action. Therefore, through the updated record of the virtual environment agent for the semantics path, the interaction between the virtual character and the virtual environment in the VR scene can be conveniently and effectively realized.

It should be understood that the sequence numbers of the steps in the foregoing embodiments do not indicate the order of execution, and the execution sequence of each process should be determined by its function and internal logic, and should not constitute any limitation on the implementation process of the embodiments of the present application.

Figure 9:
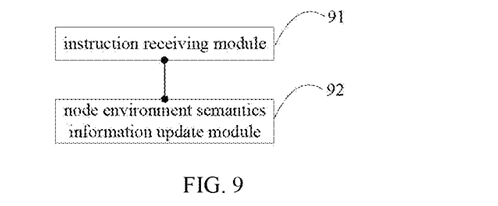
FIG. 9 is a schematic diagram of a composition of a semantics path processing unit provided by the present application.

An embodiment of the present application further provides a semantics path processing unit as shown in FIG. 9. For ease of description, only the parts related to this embodiment of the present application are shown.

The semantics path processing unit includes: an instruction receiving module 91, and a node environment semantics update module 92.

The instruction receiving module 91 is configured to receive a user instruction and construct a semantics path. The semantics path is a trajectory drawn on geometry of a virtual environment agent and composed of nodes and directed connections among the nodes, and information of the node includes at least node position information, node behavior semantics information and node environment semantics information.

Optionally, the instruction receiving module 91 specifically includes a drawing module, a behavior semantics information selection module, and an environment semantics selection module.

The drawing module is configured to receive a drawing instruction and draw the nodes and the directed connections among the nodes of the semantics path on the geometry of the virtual environment agent.

The behavior semantics information selection module is configured to receive a behavior semantics information selection instruction and add the node behavior semantics information to the nodes of the semantics path.

The environment semantics selection module is configured to receive an environment semantics selection instruction and add initial node environment semantics information to the nodes of the semantics path.

Optionally, the instruction receiving module further includes a node passage state selection module, which is configured to receive a node passage state selection instruction and add node passage state information to the nodes of the semantics path. Here the node passage state information includes first identification information used to identify the node as a path conversion node, and second identification information used to identify the node as a temporarily closed node.

The node environment semantics information update module 92 is configured to acquire action result information of the virtual environment agent, and update the node environment semantics information of the node of the semantics path according to the action result information.

Figure 10:
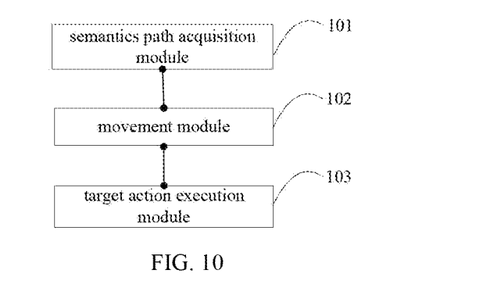
FIG. 10 is a schematic diagram of a composition of a virtual character agent provided by the present application.

An embodiment of the present application further provides a virtual character agent as shown in FIG. 10. For ease of description, only the parts related to this embodiment of the present application are shown.

The virtual character agent includes: a semantics path acquisition module 101, a movement module 102, and a target action execution module 103.

The semantics path acquisition module 101 is configured to acquire a semantics path, and semantics path is a trajectory drawn on geometry of a virtual environment agent and composed of nodes and directed connections among the nodes, and information of the nodes includes at least node position information, node behavior semantics information and node environment semantics information.

The movement module 102 is configured to move according to its own task and the semantics path.

Optionally, the movement module 102 is specifically configured to move according to its own task, the node position information and node passage status information of the semantics path.

The target action execution module 103 is configured to execute a target action according to the node behavior semantics information and the node environment semantics information of the node when position information of the virtual character agent is consistent with the node position information of the node of the semantics path.

Optionally, the target action execution module 103 is specifically configured to determine a target behavior according to the node behavior semantics information when the position information of the virtual character agent is consistent with the node position information of the node of the semantics path; to determine and execute the target action according to an execution base corresponding to the target behavior and the node environment semantics information. Here the execution base is a two-tuple that stores the environment semantics information and the target action correspondingly.

Optionally, the execution of the target action specifically includes executing target action frames and sending information of the target action to the virtual environment agent.

Figure 11:
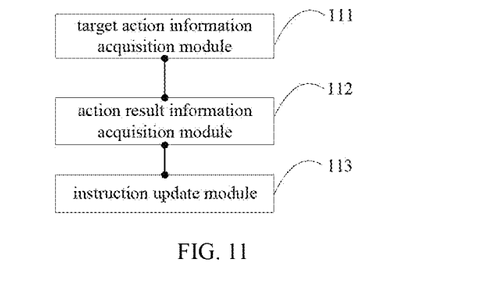
FIG. 11 is a schematic diagram of a composition of a virtual environment agent provided by the present application.

An embodiment of the present application further provides a virtual environment agent as shown in FIG. 11. For ease of description, only the parts related to this embodiment of the present application are shown.

The virtual environment agent includes: a target action information acquisition module 111, an action result information acquisition module 112, and an instruction update module 113.

The target action information acquisition module 111 is configured to acquire information of a target action of a virtual character agent at a node of the semantics path. Here the semantics path is a trajectory drawn on geometry of the virtual environment agent and composed of nodes and directed connections among the nodes, and information of the nodes includes at least node position information, node behavior semantics information, and node environment semantics information.

The action result information acquisition module 112 is configured to acquire action result information according to the information of the target action and the node environment semantics information of the node.

Optionally, the action result information acquisition module 112 is specifically configured to query environment state conversion mapping relationship of the virtual environment agent according to the information of the target action and the node environment semantics information of the node to acquire the action result information.

The instruction update module 113 is configured to instruct a semantics path processing unit to update the node environment semantics information of the nodes of the semantics path according to the action result information.

It should be noted that the information interaction and execution process etc. between the above-mentioned units/modules are based on the same concept as the method embodiments of the present application, and their specific functions and technical effects may specifically refer to the parts of the method embodiments, which will not be repeated here again.

Those skilled in the art can clearly understand that, for the convenience and conciseness of description, the division of the above-mentioned functional units and modules is only used as an example. In practical applications, the above-mentioned functions may be allocated to different functional units and modules for implementation as required, that is, the internal structure of the device is divided into different functional units or modules to realize all or part of the functions described above. The functional units and modules in the embodiments may be integrated into one processing unit, or the various units may exist alone physically, or two or more units may be integrated into one unit. The above-mentioned integrated units may be realized in a form of hardware, and may also be realized in a form of software functional units. In addition, the specific names of the functional units and modules are only for the convenience of distinguishing each other, and are not used to limit the protection scope of the present application. For the specific working process of the units and modules in the foregoing system, reference may be made to the corresponding process in the foregoing method embodiments, which will not be repeated here again.

Figure 12:
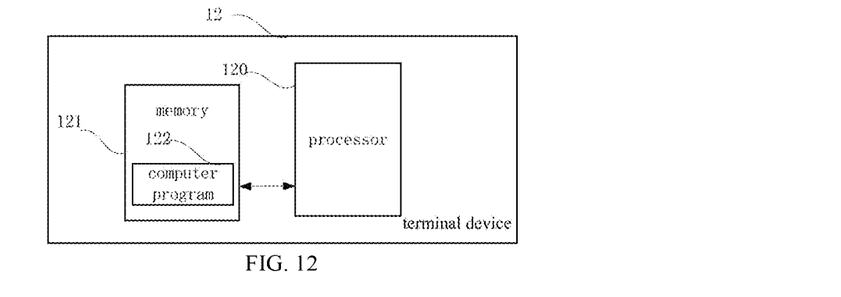
FIG. 12 is a schematic structural diagram of a terminal device provided by the present application.

FIG. 12 is a schematic diagram of a terminal device provided by an embodiment of the present application. As shown in FIG. 12, the terminal device 12 of this embodiment includes: a processor 120, a memory 121, and a computer program 122 stored in the memory 121 and executable on the processor 120, such as a interaction program of VR scenes. The processor 120, when executing the computer program 122, implements the steps in the embodiments of the above interaction method of the VR scenes, such as the steps from S301 to S302 as shown in FIG. 3, or the steps from S701 to S703 as shown in FIG. 7, or the steps from S801 to S803 as shown in FIG. 8. Alternatively, the processor 120, when executing the computer program 122, executes the functions of the modules/units in the foregoing device embodiments, such as the functions of the modules 91 and 92 as shown in FIG. 9, or the functions of the modules 101 and 102 as shown in FIG. 10, or the functions of the modules 111 and 112 as shown in FIG. 11.

Exemplarily, the computer program 122 may be divided into one or more modules/units, and the one or more modules/units are stored in the memory 121 and executed by the processor 120 to complete the present application. The one or more modules/units may be a series of computer program instruction segments capable of completing specific functions, and the instruction segments are configured to describe the execution process of the computer program 122 in the terminal device 12. For example, the computer program 122 may be divided into an instruction receiving module and a node environment semantics information update module; or the computer program 122 may be divided into a semantics path acquisition module, a movement module, and a target action execution module; or the computer program 122 may be divided into a target action information acquisition module, an action result information acquisition module, and an instruction update module.

The terminal device 12 may be a computing device such as a desktop computer, a notebook, a palmtop computer, and a cloud server etc. The terminal device may include, but is not limited to, the processor 120 and the memory 121. Those skilled in the art should understand that FIG. 12 is only an example of the terminal device 12, and does not constitute a limitation on the terminal device 12. The terminal device may include more or less components than those shown in the figure, or include a combination of certain components, or different components. For example, the terminal device may further include an input and output device, a network access device, a bus, and so on.

The so-called processor 120 may be a CPU (Central Processing Unit), and may be other general-purpose processor, DSP (Digital Signal Processor), ASIC (Application Specific Integrated Circuit), FPGA (Field-Programmable Gate Array), or other programmable logic device, discrete gate or transistor logic device, discrete hardware component, etc. The general-purpose processor may be a microprocessor or the processor may also be any conventional processor or the like.

The memory 121 may be an internal storage unit of the terminal device 12, such as a hard disk or a memory of the terminal device 12. The memory 121 may also be an external storage device of the terminal device 12, such as a plug-in hard disk, a SMC (Smart Media Card), and a SD (Secure Digital) card or a flash card etc. equipped on the terminal device 12. Further, the memory 121 may further include both an internal storage unit and an external storage device of the terminal device 12. The memory 121 is used to store the computer program and other programs and data required by the terminal device. The memory 121 may further be used to temporarily store data that has been output or will be output.

It will be clearly understood by those skilled in the art that, for convenience and brevity of description, the division of the various functional units or modules described above is only taken as an example for illustration. In practical applications, the above functions may be assigned to different functional units or modules for completion according to needs. That is, the internal structure of the device is divided into different functional units or modules to realize all or part of the functions described above. The various functional units or modules in the embodiments may be integrated into one processing unit, or each of the units may exist physically separately, or two or more units may be integrated into one unit. The above integrated unit may be implemented in a form of hardware, or may be implemented in a form of software functional unit. In addition, the specific names of the respective functional units or modules are only for the purpose of facilitating mutual differentiation, and are not intended to limit the protection scope of the present application. The specific working process of the units or modules in the foregoing system may refer to the corresponding process in the foregoing method embodiments, and details of which will be not described herein again.

In the above embodiments, each of the embodiments is described with particular emphasis, and parts that are not detailed or described in a certain embodiment may refer to related description of other embodiments.

Those of ordinary skill in the art will appreciate that, the exemplary units and algorithm steps described in combination with the embodiments disclosed herein may be implemented by electronic hardware, or a combination of computer software and electronic hardware. Whether these functions are executed in the form of hardware or software depends on a specific application and a design constraint of the technical solution. A person skilled in the art may use different methods to implement the described functions for each particular application, and such implementation should not be considered to be beyond the scope of the present application.

In the embodiments provided by the present application, it should be understood that the disclosed apparatus/terminal device and method may be implemented in other manners. For example, the apparatus/terminal device embodiments described above are merely illustrative. For example, the division of the modules or units is only a division for logical functions, and there may be other division manners in actual implementation, for example, a plurality of units or components may be combined or integrated into another system, or some features may be omitted or not executed. In addition, the mutual coupling or direct coupling or communication connection as shown or discussed may be indirect coupling or communication connection through some interfaces, devices or units, which may be in an electrical or mechanical form or other forms.

The units described as separate components may or may not be physically separate. The components shown as units may or may not be physical units, that is, may be located at one place, or may be distributed on a plurality of network units. Some or all of the units may be selected according to actual needs to achieve the purpose of the solutions of the embodiments.

In addition, the various functional units in each embodiment of the present application may be integrated into one processing unit, or each of the units may exist physically separately, or two or more units may be integrated into one unit. The above integrated units may be implemented in a form of hardware or in a form of a software functional unit.

The integrated module/unit, if implemented in the form of the software functional unit and sold or used as a stand-alone product, may be stored in a computer-readable storage medium. Based on such understanding, the present application may implement all or part of the processes in the above embodiments through instructing related hardware by a computer program, and the computer program may be stored in the computer-readable storage medium. The computer program, when executed by the processor, may implement the steps of the various method embodiments described above. Here, the computer program includes a computer program code, and the computer program code may be in a form of a source code, an object code, an executable file, or some intermediate forms. The computer-readable medium may include: any entity or apparatus capable of carrying the computer program code, a recording medium, a USB flash disk, a removable hard disk, a magnetic disk, an optical disk, a computer memory, a ROM (Read-Only Memory), a RAM (Random Access Memory), an electrical carrier signal, a telecommunication signal, or software distribution media or the like. It should be noted that, the content contained in the computer-readable medium may be appropriately increased or decreased according to requirements of legislation and patent practice in a jurisdiction. For example, in some jurisdictions, according to the legislation and the patent practice, the computer-readable medium does not include the electrical carrier signal and the telecommunication signal.

The above embodiments are only used to illustrate the technical solutions of the present application, but are not intended to limit the present application. Although the present application has been described in detail with reference to the foregoing embodiments, those of ordinary skill in the art should understand that the technical solutions disclosed in the above embodiments may be modified, or some of the technical features therein may be equivalently substituted. These modifications or substitutions do not depart corresponding technical solutions from the spirit and scope of the technical solutions of the embodiments of the present application, and should be included in the protection scope of the present application.

What is claimed is:

1. A VR scene interaction method, wherein the VR scene comprises a virtual environment agent, a virtual character agent, and a semantics path processing unit; and the VR scene interaction method comprises steps of: constructing a semantics path by the semantics path processing unit, wherein the semantics path is a trajectory drawn on geometry of the virtual environment agent and composed of nodes and directed connections among the nodes, each of the nodes comprises node information, and the node information at least comprises node position information, node behavior semantics information and node environment semantics information; acquiring the semantics path by the virtual character agent, moving the virtual character agent according to the virtual character agent's own task and the semantics path, and executing a target action by the virtual character agent according to the node behavior semantics information and the node environment semantics information of the node when position information of the virtual character agent is consistent with the node position information of the node of the semantics path; acquiring information of the target action of the virtual character agent at the node of the semantics path by the virtual environment agent, acquiring action result information by the virtual environment agent according to the information of the target action and the node environment semantics information of the node, and instructing, by the virtual environment agent, the semantics path processing unit to update the node environment semantics information of the node of the semantics path according to the action result information, when the virtual character agent executes the target action on the node such that the virtual environment agent generates the action result information.

2. The VR scene interaction method according to claim 1, wherein the method further comprises steps of: receiving a user instruction and constructing the semantics path by the semantics path processing unit; acquiring the action result information of the virtual environment agent by the semantics path processing unit, and updating the node environment semantics information of the node of the semantics path by the semantics path processing unit according to the action result information.

3. The VR scene interaction method according to claim 2, wherein the step of receiving the user instruction and constructing the semantics path comprises: receiving a drawing instruction, drawing the nodes of the semantics path and the directed connections among the nodes on the geometry of the virtual environment agent; receiving a behavior semantics information selection instruction, and adding the node behavior semantics information to the nodes of the semantics path; receiving an environment semantics selection instruction, and adding initial node environment semantics information to the nodes of the semantics path.

4. The VR scene interaction method according to claim 3, wherein the information of the nodes further comprises node passage status information, and correspondingly the step of receiving the user instruction and constructing the semantics path further comprises: receiving a node passage state selection instruction, and adding the node passage state information to the nodes of the semantics path, wherein the node passage state information comprises first identification information used to identify the node as a path conversion node and second identification information used to identify the node as a temporarily closed node.

5. The VR scene interaction method according to claim 1, wherein the information of the nodes of the semantics path further includes node passage status information, and the step of moving the virtual character agent according to the virtual character agent's own task and the semantics path comprises: moving the virtual character agent according to the virtual character agent's own task, the node position information and the node passage status information of the semantics path.

6. The VR scene interaction method according to claim 1, wherein the step, of executing the target action by the virtual character agent according to the node behavior semantics information and the node environment semantics information of the node when the position information of the virtual character agent is consistent with the node position information of the node of the semantics path, comprises: determining a target behavior according to the node behavior semantics information when the position information of the virtual character agent is consistent with the node position information of the node of the semantics path; determining and executing the target action according to an execution base corresponding to the target behavior and the node environment semantics information, wherein the execution base is a two-tuple that stores the node environment semantics information and the target action correspondingly.

7. The VR scene interaction method according to claim 1, wherein the step of executing the target action by the virtual character agent comprises: executing target action frames, and sending information of the target action to the virtual environment agent.

8. The VR scene interaction method according to claim 1, wherein the step of acquiring the action result information according to the information of the target action and the node environment semantics information of the node by the virtual environment agent comprises: querying environment state conversion mapping relationship of the virtual environment agent according to the information of the target action and the node environment semantics information of the node to acquire the action result information.

9. A VR scene, comprising a virtual environment agent, a virtual character agent, and a semantics path processing unit, wherein the semantics path processing unit comprises: an instruction receiving module configured to receive a user instruction and construct a semantics path, wherein the semantics path is a trajectory drawn on geometry of a virtual environment agent and composed of nodes and directed connections among the nodes, each of the nodes comprises node information, and the node information at least comprises node position information, node behavior semantics information and node environment semantics information; a node environment semantics information update module configured to acquire action result information of the virtual environment agent and update the node environment semantics information of the node of the semantics path according to the action result information, when the virtual character agent executes a target action on a node such that the virtual environment agent generates the action result information.

10. The VR scene according to claim 9, wherein the virtual character agent comprises: a semantics path acquisition module configured to acquire a semantics path, wherein the semantics path is a trajectory drawn on geometry of a virtual environment agent and composed of nodes and directed connections among the nodes, and information of the nodes comprises at least node position information, node behavior semantics information and node environment semantics information; a movement module configured to move according to its own task and the semantics path; a target action execution module configured to execute a target action according to the node behavior semantics information and the node environment semantics information of the node when position information of the virtual character agent is consistent with the node position information of the node of the semantics path.

11. The VR scene according to claim 9, wherein the virtual environment agent comprises: a target action information acquisition module configured to acquire information of a target action of a virtual character agent at a node of a semantics path, wherein the semantics path is a trajectory drawn on geometry of the virtual environment agent and composed of the nodes and directed connections among the nodes, and information of the nodes comprises at least node position information, node behavior semantics information and node environment semantics information; an action result information acquisition module configured to acquire action result information according to the information of the target action and the node environment semantics information of the node; an instruction update module configured to instruct a semantics path processing unit to update the node environment semantics information of the node of the semantics path according to the action result information.

12. A non-transitory computer-readable storage medium, with a computer program stored thereon, wherein the computer program, when executed by a processor, causes a terminal device to implement steps of: constructing a semantics path by a semantics path processing unit, wherein the semantics path is a trajectory drawn on geometry of a virtual environment agent and composed of nodes and directed connections among the nodes, each of the nodes comprises node information, and the node information at least comprises node position information, node behavior semantics information and node environment semantics information; acquiring the semantics path by a virtual character agent, moving the virtual character agent according to the virtual character agent's own task and the semantics path, and executing a target action by the virtual character agent according to the node behavior semantics information and the node environment semantics information of the node when position information of the virtual character agent is consistent with the node position information of the node of the semantics path; acquiring information of the target action of the virtual character agent at the node of the semantics path by the virtual environment agent, acquiring action result information by the virtual environment agent according to the information of the target action and the node environment semantics information of the node, and instructing, by the virtual environment agent, the semantics path processing unit to update the node environment semantics information of the node of the semantics path according to the action result information, when the virtual character agent executes the target action on the node such that the virtual environment agent generates the action result information.

13. The non-transitory computer-readable storage medium according to claim 12, the computer program, when executed by a processor, causes a terminal device to further implement steps of: receiving a user instruction and constructing the semantics path by the semantics path processing unit; acquiring the action result information of the virtual environment agent by the semantics path processing unit, and updating the node environment semantics information of the node of the semantics path by the semantics path processing unit according to the action result information.

14. The non-transitory computer-readable storage medium according to claim 13, wherein the step of receiving the user instruction and constructing the semantics path comprises: receiving a drawing instruction, drawing the nodes of the semantics path and the directed connections among the nodes on the geometry of the virtual environment agent; receiving a behavior semantics information selection instruction, and adding the node behavior semantics information to the nodes of the semantics path; receiving an environment semantics selection instruction, and adding initial node environment semantics information to the nodes of the semantics path.

15. The non-transitory computer-readable storage medium according to claim 14, wherein the information of the nodes further comprises node passage status information, and correspondingly the step of receiving the user instruction and constructing the semantics path further comprises: receiving a node passage state selection instruction, and adding the node passage state information to the nodes of the semantics path, wherein the node passage state information comprises first identification information used to identify the node as a path conversion node and second identification information used to identify the node as a temporarily closed node.

16. The non-transitory computer-readable storage medium according to claim 12, wherein the information of the nodes of the semantics path further includes node passage status information, and the step of moving the virtual character agent according to the virtual character agent's own task and the semantics path comprises: moving the virtual character agent according to the virtual character agent's own task, the node position information and the node passage status information of the semantics path.

17. The non-transitory computer-readable storage medium according to claim 12, wherein the step, of executing the target action by the virtual character agent according to the node behavior semantics information and the node environment semantics information of the node when the position information of the virtual character agent is consistent with the node position information of the node of the semantics path, comprises: determining a target behavior according to the node behavior semantics information when the position information of the virtual character agent is consistent with the node position information of the node of the semantics path; determining and executing the target action according to an execution base corresponding to the target behavior and the node environment semantics information, wherein the execution base is a two-tuple that stores the node environment semantics information and the target action correspondingly.

18. The non-transitory computer-readable storage medium according to claim 12, wherein the step of executing the target action by the virtual character agent comprises: executing target action frames, and sending information of the target action to the virtual environment agent.

19. The non-transitory computer-readable storage medium according to claim 12, wherein the step of acquiring the action result information according to the information of the target action and the node environment semantics information of the node by the virtual environment agent comprises: querying environment state conversion mapping relationship of the virtual environment agent according to the information of the target action and the node environment semantics information of the node to acquire the action result information.

* * * * *